United States Patent [19]

Huggard et al.

[11] Patent Number: 5,137,937
[45] Date of Patent: Aug. 11, 1992

[54] FLAME RETARDANT THERMOPLASTIC RESIN COMPOSITION WITH INTUMESCENT FLAME RETARDANT

[75] Inventors: Mark T. Huggard, Mechanicsville; Preston S. White, Glen Allen, both of Va.

[73] Assignee: Albright & Wilson Americas Inc., Ashland, Va.

[21] Appl. No.: 679,639

[22] Filed: Apr. 2, 1991

[51] Int. Cl.⁵ .............................................. C08K 21/14
[52] U.S. Cl. ....................................... 523/179; 521/85; 521/907
[58] Field of Search .................. 523/179; 521/85, 907

[56] References Cited

U.S. PATENT DOCUMENTS

| | | | |
|---|---|---|---|
| 3,681,273 | 8/1972 | Kelly | 260/DIG. 24 |
| 3,914,513 | 10/1975 | Brown et al. | 260/DIG. 24 |
| 4,198,328 | 4/1980 | Bertelli et al. | 260/DIG. 24 |
| 4,349,494 | 9/1982 | Fulmer | 521/906 |
| 4,404,297 | 9/1983 | Fishler et al. | 523/179 |
| 4,486,553 | 12/1984 | Wesch | 523/179 |
| 4,600,734 | 7/1986 | von Bonin et al. | 523/179 |

Primary Examiner—Morton Foelak
Attorney, Agent, or Firm—Frishauf, Holtz, Goodman & Woodward

[57] ABSTRACT

The present invention is a flame retarded thermoplastic resin composition comprising a thermoplastic resin, optional adjuvants for the resin, and a flame retardant; the flame retardant is an amine salt of a phosphorus acid in an effective amount.

8 Claims, No Drawings

FLAME RETARDANT THERMOPLASTIC RESIN COMPOSITION WITH INTUMESCENT FLAME RETARDANT

BACKGROUND OF THE INVENTION

The present invention is a flame retarded thermoplastic resin composition containing an intumescent flame retardant.

Although flame retarded thermoplastic resin compositions are known, it is usual to use intumescent fire retardants which require synergists, for sufficient effect to be useful. Intumescent nitrogen-phosphorus fire retardant systems have been used for many years. The systems have the potential benefits of low smoke and of being halogen free. They are typically based on phosphate salts and synergists. The synergists include polyhydric and nitrogen containing compounds. Various synergists and their precursors have been developed for specific applications and the identification and selection of synergists remains an area of active work due to potential benefits of a high performance product capable of meeting stringent processing, physical property and smoke corrosivity standards and a number of patents have been issued over the last ten years which describe the use of these fire retardants in thermoplastic and mastic applications. Among these patents are U.S. Pat. Nos. 4,694,030; 3,485,793; 3,442,849; 4,727,102; 4,174,343; 4,104,073; and French Patent No. 2 367 302. In general, types of resins and these uses are well known (see for example U.S. Pat. No. 4,174,343 and 4,727,102).

Although useful in fire retarding some polymer systems, known intumescent fire retardants have disadvantages which limit their use. The present invention provides an intumescent system which avoids disadvantages of the known intumescent fire retardants to provide useful compositions.

One disadvantage of the known intumescent fire retardants is that the known fire retardants impart a variety of performance problems and other deficiencies to the resin composition. These problems can limit or eliminate their usefulness with some resins and in particular, polyolefins. Off-gassing and liquid bleed out in particular have been found in these systems and these disadvantages are believed to have been caused by phosphate salt/synergist interactions.

The present invention provides a new intumescent fire retardant which does not require the use of synergists in order to provide sufficient effectiveness.

SUMMARY OF THE INVENTION

The invention is a flame retarded thermoplastic resin composition comprising a thermoplastic resin and a flame retardant. The flame retardant is an amine salt of a phosphorus acid or alkyl ester, which is present in an effective amount to provide the required flame retardant properties.

Amine salts of phosphoric acid or an alkyl ester of phosphoric acid have been found to be particularly useful. Melamine phosphate is also useful.

When these compounds are used in amounts of 10 to 50% (preferably 20–40%) by weight of the total composition, effective flame retardancy is imparted to the composition with little or no deterioration in physical properties as is observed when the use of the synergist is required.

DETAILED DESCRIPTION OF THE INVENTION

There are many amine/phosphorus containing salts which are useful for the present invention. In general these are amine salts of phosphoric acid or lower alkyl esters thereof. Lower alkyl esters means that $C_1$–$C_8$ alkyl ester has been made of one or more sites on the phosphoric acid group. Preferably $C_1$–$C_4$ alkyl esters are used and most preferably an ethyl ester or no ester group is used.

The alkyl diamines which are useful to form alkyl diamine phosphate flame retardants are preferably lower alkyl diamines such as $C_2$–$C_8$ alkyl diamines and preferably $C_2$–$C_4$ alkyl diamines.

Ethyl diamine phosphate is the most preferred flame retardant because it gives relatively high phosphorus content and can be obtained inexpensively from commercial sources.

Thermoplastic resins for use in the present invention include polymers, copolymers and blends of various resins such as polyolefins and various styrene polymers. Examples of resins include polypropylene homopolymers; propylene copolymers with ethylene, vinyl acetate, butadiene and/or other monomers which produce a variety of polyolefin polymers. Ethylene homopolymers and copolymers, rubbers and other hydrocarbon polymers are further examples. Particularly preferred polyolefins include polyethylenes, polypropylenes and copolymers thereof or with other olefinic monomers such as butene-1, isobutylene, acrylic acids, esters of acrylic acids, vinyl acetate and the like or combinations thereof and/or blends of these polymers and copolymers. Styrene polymers include polystyrene, substituted polystyrene and impact modified polystyrene containing rubber such as butadiene. Also included are acrylonitrile butadiene styrene and other styrene containing copolymers.

Usual optional adjuvants can be used including fillers and reinforcing agents, process aids and plasticizers, stabilizers, antioxidants, pigments, coupling agents or other materials used to modify the base polymer without significantly reducing the desirable flame retardant property of the invention.

In general, the physical appearance of the invention composition is superior to that using known systems. In particular, no surface exudation is seen in polypropylene containing EDAP or melamine phosphate. This is in marked contrast to polypropylene containing 30% of a blend of 3 parts ammonium polyphosphate and 1 part pentaerythritol (APP/PE) where an oily surface develop soon after processing.

Also, processing temperatures of the flame retarded resin composition can be higher by 10–20 degrees celsius when alkyl amine phosphorus acids are used instead of the APP/PE system because the relatively volatile PE is not required.

For the purposes of determining flame retardancy, American National Standard ANSI/UL 94 - 1985 Procedures of the Underwriters Laboratory Inc. are used. Vertical burning flame tests were applied and ratings of NR (no rating), V2, V1 and V0 (highest rating) are possible. A rating of NR (no rating) indicates a lack of flame retardance properties.

In general, amine/phosphorus containing salts which are useful for the present invention. These are, in particular, amine salts of phosphoric acid or alkyl esters thereof. Ethyl diamine phosphate is particularly preferred because it gives relatively high phosphorus content and can be obtained inexpensively or produced inexpensively and easily. Melamine phosphate provides good results but is relatively expensive to obtain or produce.

EXPERIMENTAL

Experiment 1

Polypropylene (PP) homopolymer was compounded with 40% melamine phosphate (MP) and was tested following U.L. 94 procedures. This composition achieved a rating of V2 in the U.L. 94 test, compared to no rating without melamine phosphate.

Experiment 2

Polypropylene homopolymer (Himont 6523) was compounded with 40% ethyl diamine phosphate (EDAP), injection molded and tested. A comparison of physical properties and U.L. 94 performance of this plastic with polypropylene homopolymer (control), 40% talc filled polypropylene and 40% calcium carbonate filled polypropylene was made. Polypropylene alone (control) and the mineral filled (40% talc and 40% calcium carbonate samples) polypropylene plastics achieve a NR rating in the U.L. 94 test. The EDAP filled plastic achieved a rating of V0.

Experiment 3

Additional levels of alkyl amine phosphoric acids were tested to show achievement of U.L. 94 V2 performance.

A sample containing 20-30% EDAP compounded with polypropylene homopolymer achieved a V2 rating in the U.L. 94 testing.

This is a distinct advantage over known phosphorus salt containing flame retardant systems for polypropylene where V2 ratings are not possible. A comparative sample was prepared with levels of a blend of 3 parts ammonium polyphosphate and 1 part pentaerythritol in polypropylene resulted in no rating at loadings up to 25-30%; at 30% the rating jumped to V0, (no V2 rating is observed).

TESTING PROCEDURES

Experiment 5

Testing was conducted with compression molded powder blends. The correlation of U.L. 94 burn test results between the screening method and industrial results has been reported in Huggard et al Guideline for "Flame Retarding Thermoplastic and Thermoset Polymers with Phosphorus Compounds", Business Communications Co., Inc. symposia, Stamford, Conn., May 15-17, 1990.

Thermal analyses included thermogravimetric analysis (TGA) and differential scanning calorimetry (DSC); both tests used a temperature rise of 10° C./min in air. Polypropylene percent crystallinity is based on a pure crystal heat of fusion of 239 kJ/kg.

Physical property results are based on samples prepared by twin screw compounding followed by injection molding. Samples were conditioned for 48 hours at 72° F. and 50% relative humidity and tested according to ASTM standards.

The polypropylene resins are general purpose and mineral filled commercial grades of polypropylene. Additives in the EDAP formulations included titanate coupling agents (0.25%), phosphite antioxidants (0.25%) and titanium dioxide (2%).

Testing in various hydrocarbon polymers is summarized below (Table 1), U.L. 94 ratings are achieved in polypropylene, polyethylene, and ethylene-vinyl acetate copolymers with additions of 30 to 40 weight percent fire retardant. For example, U.L. 94 V0 ratings in polypropylene are achieved with 30 percent additions at 1/16 inch, 25 percent is required at ⅛ inch. The char developed during burning was seen to be well developed and relatively strong. These screening results show the new flame retardant to be an efficient char forming fire retardant in hydrocarbon polymers.

Physical properties also shown below, coupled with flame retardant properties indicate highly favorable properties for use in consumer, construction and electronic products.

TABLE I

| | EDAP Performance U.L. 94 Screening Results Wt. Percent EDAP | | | |
|---|---|---|---|---|
| Resin | 25% | 30% | 35% | 40% |
| Polypropylene 1/16" | NR | V0 | V0 | V0 |
| ⅛" | V0 | V0 | V0 | V0 |
| Low density 1/16" | NR* | NR | NR | V0 |
| Polypropylene ⅛" | NR | V0 | V0 | V0 |
| Ethylene Vinyl 1/16" | V2 | V2 | V2 | V0 |
| Acetate ⅛" | V2 | V2 | V0 | V0 |

*NR—not rated.

It was observed that the use of a synergist causes liquid bleed out to be seen on fire retardant samples. These are samples containing amine phosphate, melamine and pentaerythritol.

The effects of EDAP on the burn performance of polypropylene include a significant char development. High char yields are also seen in thermal decomposition comparisons (Table 2) of filled and unfilled polypropylene. Fifty weight percent char residues remain at 400° C. when EDAP is present whereas nearly all the polypropylene has been consumed. Only small changes in off gassing and weight loss are seen between the PP, EDAP and EDAP/PP samples at temperatures below 250° C.

TABLE 2

| Thermal Decomposition of Fire Retardant Polypropylene Percent Weight Lost | | | |
|---|---|---|---|
| Temperature, °C. | EDAP | Polypropylene | PP with 40% EDAP |
| 250 | 2 | 0 | 1 |
| 300 | 15 | 6 | 11 |
| 400 | 33 | 97 | 48 |
| 500 | 43 | 98 | 59 |

As seen in differential scanning calorimeter (DSC) results summarized in Table 3, polypropylene's glass transition and crystalline melting temperature are not affected by the amine phosphate. A reduction in total crystallinity of about 10 percent is observed in polypropylene.

TABLE 3

| Effect of EDAP on Polypropylene DSC Results | | |
|---|---|---|
| | Polypropylene | PP with 30% EDAP |
| Glass Transition, °C | −8 | −7 |
| Crystal Melting, °C | 170 | 170 |

TABLE 3-continued

| Effect of EDAP on Polypropylene DSC Results | | |
|---|---|---|
| | Polypropylene | PP with 30% EDAP |
| Percent Crystallinity | 43 | 33 |

U.L. 94 V0 rated polypropylene is achieved with 30 percent EDAP at 1/16". Exceptionally good physical properties are seen in the fire retardant polypropylene as compared to the base resin. An increase in the impact resistance and good elongation are seen in the relatively low density product (Table 4).

TABLE 4

| EDAP Performance in Polypropylene | | | |
|---|---|---|---|
| Loading, wt. % | | 0 | 30 |
| U.L. 94 Rating, | 1/16" | NR | V0 |
| | 1" | NR | V0 |
| Density, g/cc | | 0.90 | 1.01 |
| Melt Flow Index, 230/2.16 | | 4.6 | 3.2 |
| Tensile: | | | |
| Break, PSI | | 2800 | 2500 |
| Yield, PSI | | 4500 | 3000 |
| Elongation, % | | 270 | 230 |
| Impact, notched Izod (ft. lb./in.) | | 0.8 | 1.2 |
| DTUL, 66 PSI, °C. | | 108 | 122 |

The general performance characteristics of the fire retardant polypropylene are comparable to filled grades of polypropylene, as seen in Table 5. The additives studied were calcium carbonate, talc and EDAP, all at 40 percent loadings. Material containing 40 percent additive was studied due to the prevalence of products having this level of filler. Very high quality parts were obtained in all cases. The fire retardant plastics has a lower density, higher elongation and better impact resistance than the calcium or talc filled materials.

TABLE 5

| EDAP Performance in Polypropylene | | | | |
|---|---|---|---|---|
| Additive | Control | EDAP | Talc | CaCO₃ |
| Loading, wt. % | — | 40 | 40 | 40 |
| U.L. 94, 1/16" | NR | V0 | NR | NR |
| Density, g/cc | 0.90 | 1.02 | 1.22 | 1.22 |
| MFI, 190/2.16 | 4.6 | 3.6 | 5.7 | 5.0 |
| Tensile: | | | | |
| Break, PSI | 2800 | 2350 | 3600 | 2500 |
| Yield, PSI | 4500 | 2700 | 4200 | 3500 |
| Elongation, % | 270 | 100 | 20 | 50 |
| Impact, notched Izod | 0.8 | 1.4 | 0.4 | 0.8 |
| (ft. Lbs/in) | | | | |
| DTUL, 66 PSI, °C | 108 | 120 | 139 | 117 |

| Additional Testing of Thermoplastic Resins Percent EDAP Load | | | | | | |
|---|---|---|---|---|---|---|
| Resin/sample | | 20% | 25% | 30% | 35% | 40% |
| Ethylene acetate | 1/16" | V2 | V2 | V2 | V0 | V0 |
| | 1" | V2 | V2 | V2 | V0 | V0 |
| Low density polyethylene | 1/16" | V0 | NR | V0 | V0 | V0 |
| Polypropylene | 1/16" | NR | — | V0 | V0 | V0 |
| | 1" | V2 | — | V0 | V0 | V0 |
| Acrylonitrile butadiene styrene | 1/16" | NR | NR | NR | NR | V0 |
| | 1" | NR | NR | NR | V0 | V0 |
| High impact polystyrene | 1/16" | — | NR | NR | V2 | V2 |
| | 1" | — | NR | NR | NR | V0 |

The Examples above are intended to be illustrative and not limitative of the flame retardant or self-extinguishing resin compositions of the present invention. As noted above, many thermoplastic resins can be used. Also a wide variety of flame retardants are available.

What is claimed is:

1. A flame retarded thermoplastic resin composition comprising a thermoplastic resin, optional adjuvants for the resin, and an intumescent flame retardant; said flame retardant consisting essentially of a $C_2$-$C_8$ alkyl diamine phosphate in an effective amount.

2. The flame retarded thermoplastic resin composition of claim 1 wherein said thermoplastic resin is an ethylene or propylene homo polymer or an ethylene or propylene copolymer.

3. The flame retarded thermoplastic resin composition of claim 1 wherein said thermoplastic resin is a styrene polymer or copolymer.

4. The flame retarded thermoplastic resin composition of claim 2 or 3 wherein said flame retardant is diamine phosphate.

5. The flame retarded thermoplastic resin composition of claim 1 wherein the flame retardant is used in an amount of 10-50% by weight.

6. The flame retarded thermoplastic resin of claim 5 wherein the flame retardant is used in an amount of 20-40% by weight.

7. The flame retarded thermoplastic resin composition of claim 2 wherein the flame retardant is used in an amount of 10-50% by weight.

8. The flame retarded thermoplastic resin of claim 7 wherein the flame retardant is used in amount of 20-40% by weight.

* * * * *